US012746997B2

(12) United States Patent
Cheng

(10) Patent No.: US 12,746,997 B2
(45) Date of Patent: Sep. 29, 2026

(54) PEDALING SENSING DEVICE OF ELECTRIC BICYCLE

(71) Applicant: UNIQUE PRODUCT & DESIGN CO., LTD., Tainan City (TW)

(72) Inventor: Chih-Ching Cheng, Tainan City (TW)

(73) Assignee: UNIQUE PRODUCT & DESIGN CO., LTD., Tainan City (TW)

( * ) Notice: Subject to any disclaimer, the term of this patent is extended or adjusted under 35 U.S.C. 154(b) by 1021 days.

(21) Appl. No.: 17/965,964

(22) Filed: Oct. 14, 2022

(65) Prior Publication Data

US 2023/0033077 A1 Feb. 2, 2023

Related U.S. Application Data

(63) Continuation of application No. 16/939,734, filed on Jul. 27, 2020, now abandoned.

(30) Foreign Application Priority Data

Aug. 6, 2019 (TW) ................................ 108210360

(51) Int. Cl.
*B62M 6/50* (2010.01)
*B62J 45/41* (2020.01)
(Continued)

(52) U.S. Cl.
CPC ................ *B62M 6/50* (2013.01); *B62J 45/41* (2020.02); *B62M 6/55* (2013.01); *B62M 6/60* (2013.01); *G01L 3/101* (2013.01)

(58) Field of Classification Search
CPC ... B62M 6/50; B62M 6/55; B62M 6/60; B62J 45/41; B62J 45/11; G01L 3/101; G01L 3/1464; G01L 1/044; G01L 1/122
See application file for complete search history.

(56) References Cited

U.S. PATENT DOCUMENTS 10,151,650 B2 * 12/2018 Buckley .................. G01L 5/225
2015/0214813 A1 7/2015 Timonen
(Continued)

FOREIGN PATENT DOCUMENTS

CN 206049955 U 3/2017
CN 206691312 U 12/2017
(Continued)

OTHER PUBLICATIONS

Gear Motions, Advantages of Helical Gears, Feb. 15, 2013. (Year: 2013).

*Primary Examiner* — Valentin Neacsu
*Assistant Examiner* — Abigail R Hymel
(74) *Attorney, Agent, or Firm* — MUNCY, GEISSLER, OLDS & LOWE, P.C.

(57) ABSTRACT

A pedaling sensing device of an electric bicycle is configured to connect to a motor and includes a crank axle, a first gearwheel, a second gearwheel, an assisting unit and a sensing unit. The crank axle extends along an axial direction and has a plurality of first helical teeth connected to each other and arranged continuously. The first gearwheel is disposed around the crank axle and comprises a first inner annulus surface and a first outer annulus surface. The first inner annulus surface is formed with a plurality of second helical teeth matching the first helical teeth. The second helical teeth are connected to each other and arranged continuously. The second gearwheel is disposed around the first gearwheel and has a second inner annulus surface. The second inner annulus surface is formed with a second transmission structure matching the first transmission structure.

19 Claims, 6 Drawing Sheets

(51) Int. Cl.

| | |
|---|---|
| ***B62M 6/55*** | (2010.01) |
| ***B62M 6/60*** | (2010.01) |
| ***G01L 3/10*** | (2006.01) |

(56) References Cited

U.S. PATENT DOCUMENTS

| | | | | |
|---|---|---|---|---|
| 2017/0113756 | A1 | 4/2017 | Yoshiie et al. | |
| 2018/0072376 | A1 * | 3/2018 | Kao | B62J 45/411 |
| 2018/0244342 | A1 | 8/2018 | Mac Martin | |
| 2018/0290709 | A1 | 10/2018 | Tsuchizawa et al. | |
| 2019/0185106 | A1 | 6/2019 | Lin et al. | |

FOREIGN PATENT DOCUMENTS

| | | | | | |
|---|---|---|---|---|---|
| CN | 105966539 | A | * | 3/2018 | B62M 6/50 |
| CN | 108639225 | A | | 10/2018 | |
| CN | 109131710 | A | * | 12/2018 | H02K 7/1861 |
| DE | 202014103462 | U1 | | 10/2015 | |
| JP | 2000142545 | A | | 5/2000 | |

* cited by examiner

PEDALING SENSING DEVICE OF ELECTRIC BICYCLE

CROSS REFERENCE TO RELATED APPLICATIONS

This Non-provisional application claims priority under 35 U.S.C. § 119 (a) on Patent Application No(s). 108210360 filed in Taiwan, Republic of China on Aug. 6, 2019, the entire contents of which are hereby incorporated by reference.

This application is a Continuation Application (CA) of an earlier filed, pending, application, having application Ser. No. 16/939,734 and filed on Jul. 27, 2020, the content of which, including drawings, is expressly incorporated by reference herein.

BACKGROUND

Technology Field

This disclosure relates to a sensing device and, in particular, to a pedaling sensing device of an electric bicycle with an electric powering function that can transfer the force applied to the crank axle into a sensing signal.

Description of Related Art

Bicycles are commonly used by people as a means of travel. Since riding bicycles can achieve exercise effects and save energy, more and more people like to go out by bicycle. However, when riding on a hill or mountain or riding for a long distance, the rider may not enjoy the riding trip. Besides, the older riders may easily feel tired when riding bicycles. Therefore, in order to make people ride more smoothly and easier, an electric bicycle (also known as an e-bike) is provided on the market. The electric bicycle is a bicycle with an integrated electric motor, which can be used for propulsion, to assist the rider's pedal-power, thereby making the riders easier and more power saving. In general, the electric bicycle comprises a pedaling sensing device for detecting the rider's pedaling force and then driving the motor to generate the assisting power as the pedaling force is detected.

Therefore, for the sake of the large requirements for electric bicycles, a novel pedaling sensing device of an electric bicycle is provided that can correctly sense the user's pedaling force for driving the motor to operate.

SUMMARY

In view of the foregoing, an objective of this disclosure is to provide a pedaling sensing device of an electric bicycle having a novel structure and a good sensing effect.

This disclosure provides a pedaling sensing device of an electric bicycle, which is configured to connect to a motor of the electric bicycle, and comprises a crank axle, a first gearwheel, a second gearwheel, a sensing unit, an assisting unit, and a chain wheel.

The crank axle extends along an axial direction and comprises an outer surface, and a plurality of first bevel teeth are disposed around the outer surface. The first gearwheel is disposed around the outer surface of the crank axle and comprises a first inner annulus surface and a first outer annulus surface opposite to the first inner annulus surface. The first inner annulus surface is formed with a plurality of second bevel teeth matching the first bevel teeth, and the first outer annulus surface is formed with a first transmission structure.

The second gearwheel is disposed around the first outer annulus surface of the first gearwheel. The second gearwheel comprises a second inner annulus surface disposed around the first outer annulus surface, and the second inner annulus surface is formed with a second transmission structure matching the first transmission structure. The sensing unit is disposed around the crank axle and located adjacent to the first gearwheel, and the sensing unit is signally connected with the motor. The assisting unit comprises an assisting gearwheel disposed around the crank axle, and the motor is configured to drive the assisting gearwheel to rotate. The chain wheel is disposed around the crank axle and connects to the assisting unit.

BRIEF DESCRIPTION OF THE DRAWINGS

The disclosure will become more fully understood from the detailed description and accompanying drawings, which are given for illustration only, and thus are not limitative of the present disclosure, and wherein.

DETAILED DESCRIPTION OF THE DISCLOSURE

The present disclosure will be apparent from the following detailed description, which proceeds with reference to the accompanying drawings, wherein the same references relate to the same elements.

Figure 1:
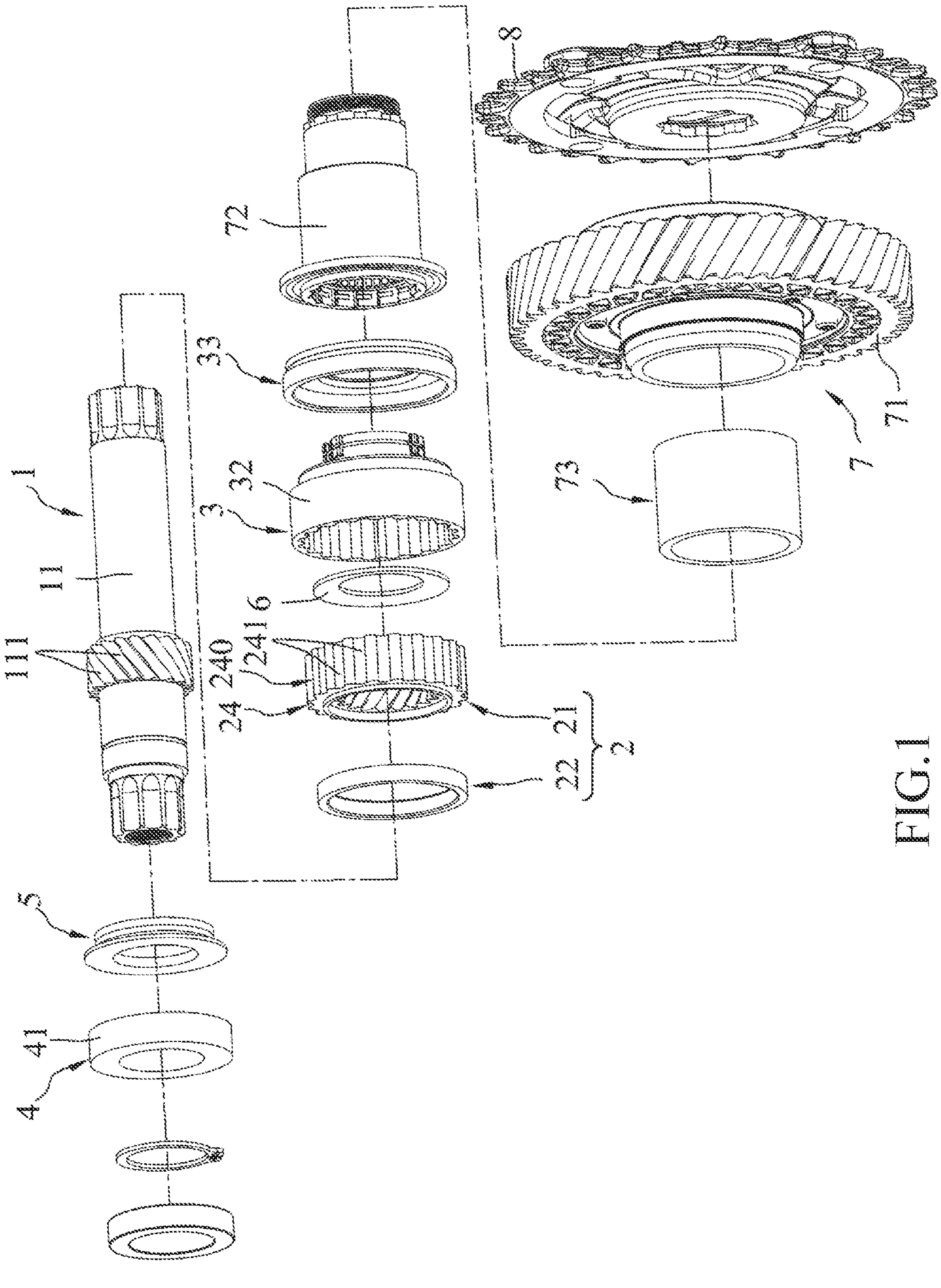
FIG. 1 is an exploded perspective view of a pedaling sensing device of an electric bicycle according to a first embodiment of this disclosure.
Figure 2:
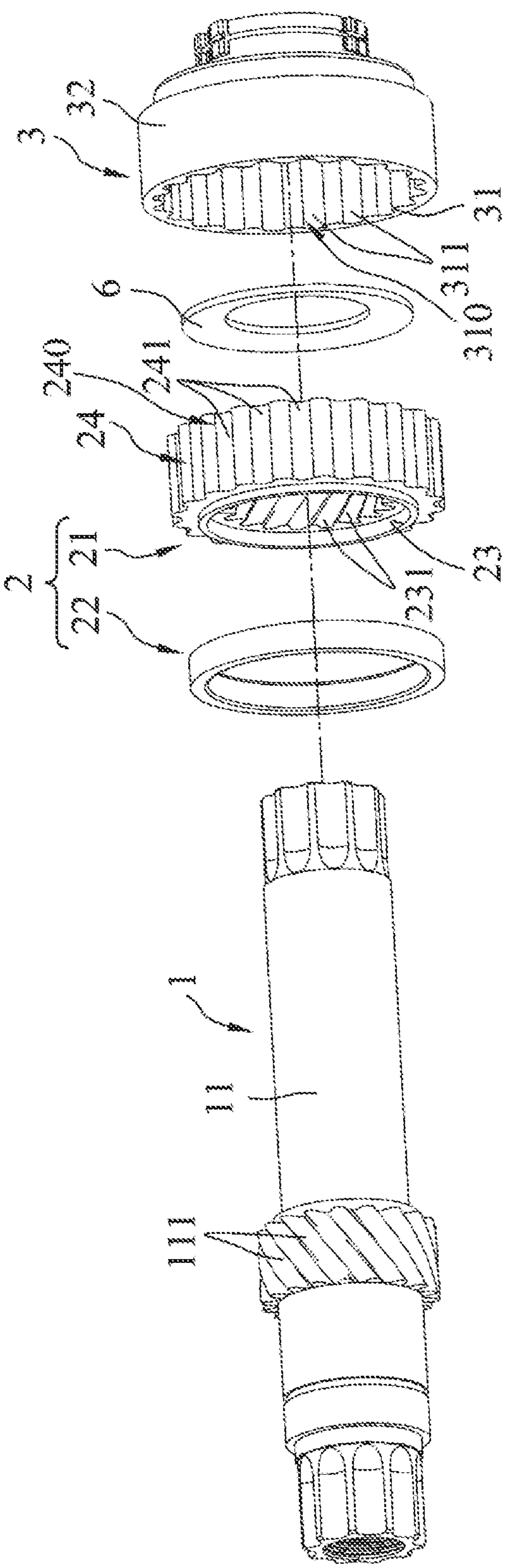
FIG. 2 is an exploded perspective view of parts of the first embodiment.
Figure 3:
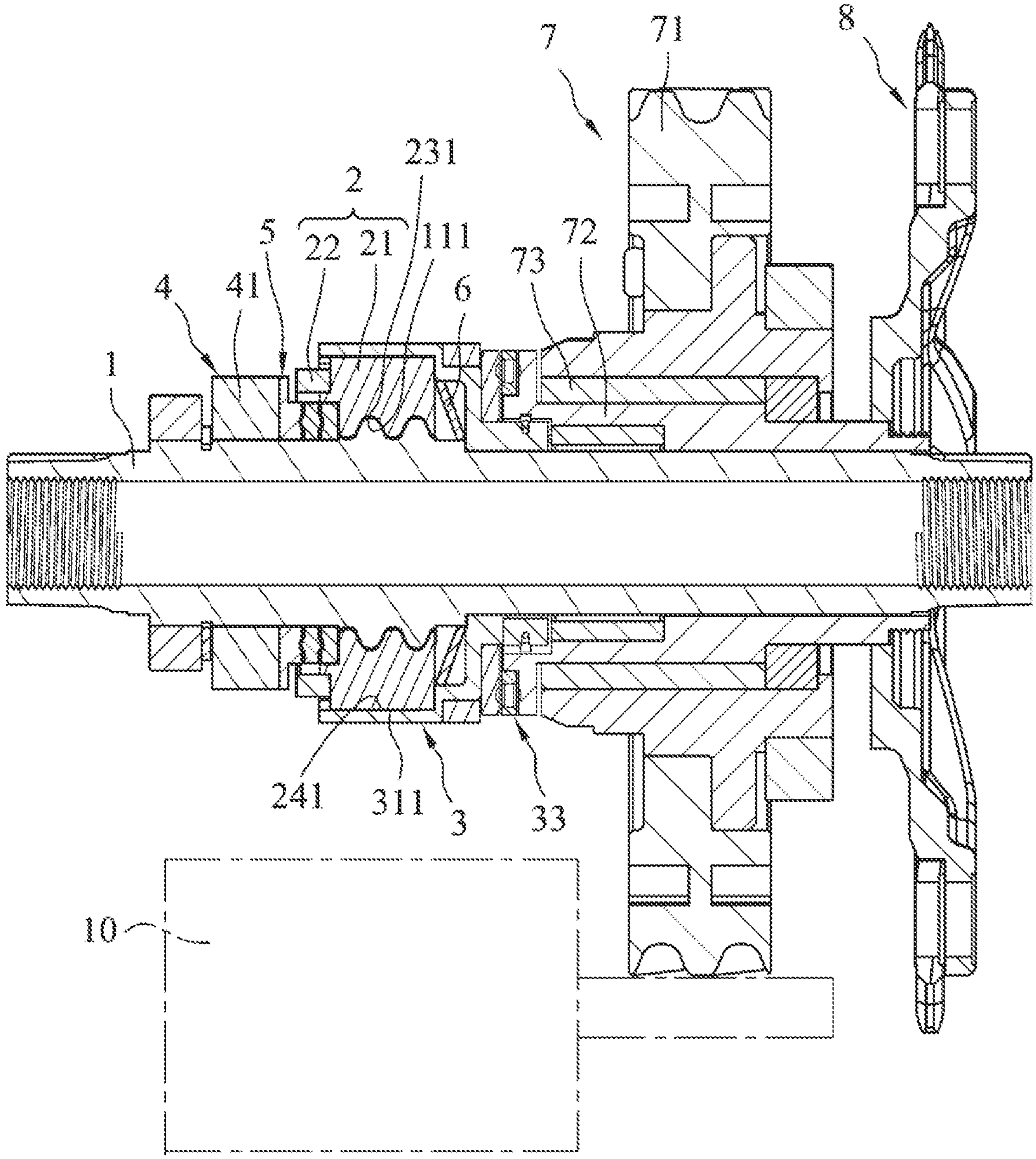
FIG. 3 is a sectional view of an assembled pedaling sensing device of the first embodiment.

Referring to FIGS. 1 to 3, in a first embodiment of this disclosure, a pedaling sensing device of an electric bicycle, which is configured to connect to a motor 10 of the electric bicycle, comprises a crank axle 1, a first gearwheel 2, a second gearwheel 3, a sensing unit 4, a thrust bearing 5, an elastic element 6, an assisting unit 7, and a chain wheel 8.

The crank axle 1 extends along an axial direction A and comprises an outer surface 11. A plurality of first bevel teeth 111 are disposed annularly around the outer surface 11. Each end of the crank axle 1 is connected to a crank (not shown), and the crank is further connected to a pedal (not shown).

In this embodiment, the first gearwheel 2 is composed of two portions including a main body portion 21 and a ring portion 22 disposed at one end of the main body portion 21. In practice, the main body portion 21 and the ring portion 22 can be integrated as one piece, or the ring portion 22 can be omitted. The first gearwheel 2 is disposed around the outer surface 11 of the crank axle 1. The first gearwheel 2 comprises a first inner annulus surface 23 and a first outer annulus surface 24. The first inner annulus surface 23 has an annular shape and is disposed toward the outer surface 11 of the crank axle 1. The first outer annulus surface 24 is located opposite to the first inner annulus surface 23. The first inner annulus surface 23 is formed with a plurality of second bevel teeth 231 for engaging with (matching) the first bevel teeth 111. The first outer annulus surface 24 is formed with a first transmission structure 240. The first transmission structure 240 comprises a plurality of first straight teeth 241 disposed around the first outer annulus surface 24 and extending along the axial direction A. Since the second bevel teeth 231 of the first gearwheel are engaged with the first bevel teeth 111 of the crank axle, when the crank axle 1 rotates, the first gearwheel 2 can be carried to rotate, thereby providing a force for generating an axial displacement of the first gearwheel 2. Accordingly, when the first gearwheel 2 is rotated, it can be also moved with respect to the crank axle 1 along the axial direction A.

The second gearwheel 3 is disposed around the first outer annulus surface 24 of the first gearwheel 2. In this embodiment, the second gearwheel 3 comprises a second inner annulus surface 31 and a second outer annulus surface 32. The second inner annulus surface 31 is disposed around the first outer annulus surface 24, and the second outer annulus surface 32 is disposed opposite to the second inner annulus surface 31. The second inner annulus surface 31 is formed with a second transmission structure 310 matching the first transmission structure 240. The second transmission structure 310 comprises a plurality of second straight teeth 311 for engaging with the first straight teeth 241. Accordingly, the first gearwheel 2 can carry the second gearwheel 3 to rotate. At least a bearing 33 is disposed adjacent to the second gearwheel 3 for making the rotation of the second gearwheel smoother.

To be noted, in practice, the first transmission structure 240 and the second transmission structure 310 can be formed with another type of structures such as the bevel teeth or wavy teeth. Accordingly, the first gearwheel 2 can still carry the second gearwheel 3 to rotate.

The sensing unit 4 is installed around the crank axle 1 and located adjacent to the first gearwheel 2, and the sensing unit 4 is signally connected with the motor 10. Specifically, the sensing unit 4 of the first embodiment comprises a pressure sensing element 41 disposed around the crank axle 1 for sensing a pressing force from the first gearwheel 2.

The thrust bearing 5 is disposed around the crank axle 1 and is located between the first gearwheel 2 and the pressure sensing element 41. The elastic element 6 is a disc spring. The elastic element 6 is disposed around the crank axle 1 and is located at one side of the first gearwheel 2 away from the thrust bearing 5. In practice, the elastic element 6 pushes the first gearwheel 2 toward the thrust bearing 5, so that the first gearwheel 2 can apply a predetermined pressing force to the pressure sensing element 41 through the thrust bearing 5.

The assisting unit 7 comprises an assisting gearwheel 71, a connecting base 72 and a one-way bearing 73. The assisting gearwheel 71 is disposed around the crank axle 1, wherein the motor 10 is configured to drive the assisting gearwheel 71 to rotate. The connecting base 72 is disposed around the crank axle 1 and is located between the crank axle 1 and the assisting gearwheel 71. The one-way bearing 73 is disposed around the connecting base 72 and is located between the connecting base 72 and the assisting gearwheel 71. The chain wheel 8 is disposed around the crank axle 1 and is connected to the connecting base 72 of the assisting unit 7.

For example, when the rider pedals forwardly to drive the crank axle 1 to rotate forwardly, the crank axle 1 can carry the engaged first gearwheel 2 and second gearwheel 3 to rotate, and thus carry the connecting base 72 as well as the chain wheel 8 to rotate. Herein, the crank axle 1 is applied with a force, which is a torque transferred from the pedaling of the rider. Accordingly, the propulsion of the electric bicycle can be provided by the pedaling of the rider.

Moreover, when the rider pedals to provide the propulsion of the electric bicycle, the applied force can also drive the crank axle 1 to rotate the first gearwheel 2. Since the second bevel teeth 231 of the first gearwheel 2 are engaged with the first bevel teeth 111 of the crank axle 1, a force along the axial direction A can be applied to the first gearwheel 2, thereby pushing the first gearwheel 2 to move with respect to the crank axle 1 along the axial direction A. To be noted, the movement of the first gearwheel 2 is very small, so it is not shown in the figures. In the first embodiment, the design of the extension directions of the first bevel teeth 111 and the second bevel teeth 231 allows the first gearwheel 2 to move toward the pressure sensing element 41 along the axial direction A. Then, the first gearwheel 2 pushes the thrust bearing 5 so as to generate a pressing force to press the pressure sensing element 41. When the pressing force increases, the pressure sensing element 41 can sense the applied force and then transform the sensed force into an electrical signal, which is then sent to the motor 10 for controlling the motor to operate. Accordingly, the motor 10 can be enabled to drive the assisting gearwheel 71 to rotate. Then, the connecting base 72 can transmit the power of the motor 10 to the chain wheel so as to provide the assisting power to rotate chain wheel.

In other words, when the rider pedals to rotate the chain wheel 8, the first gearwheel 2 can also apply a force to the sensing unit 4. Once the sensing unit 4 senses the applied force, it can control the motor 10 to operate for assisting the rotation of the chain wheel, thereby achieving the desired assisting riding effect. Accordingly, the rider can ride the electric bicycle easier. To be noted, when the motor 10 drives the assisting gearwheel 71 to rotate through the one-way bearing 73 of the assisting unit 7, the crank axle 1 is not affected. When the on-way bearing 73 rotates the assisting gearwheel 71, the connecting base 72 and the chain wheel are carried to rotate in one-way. If the rider stops pedaling, the first gearwheel 2 will return to the original position as shown in FIG. 3, and the motor 10 stops operation.

Figure 4:
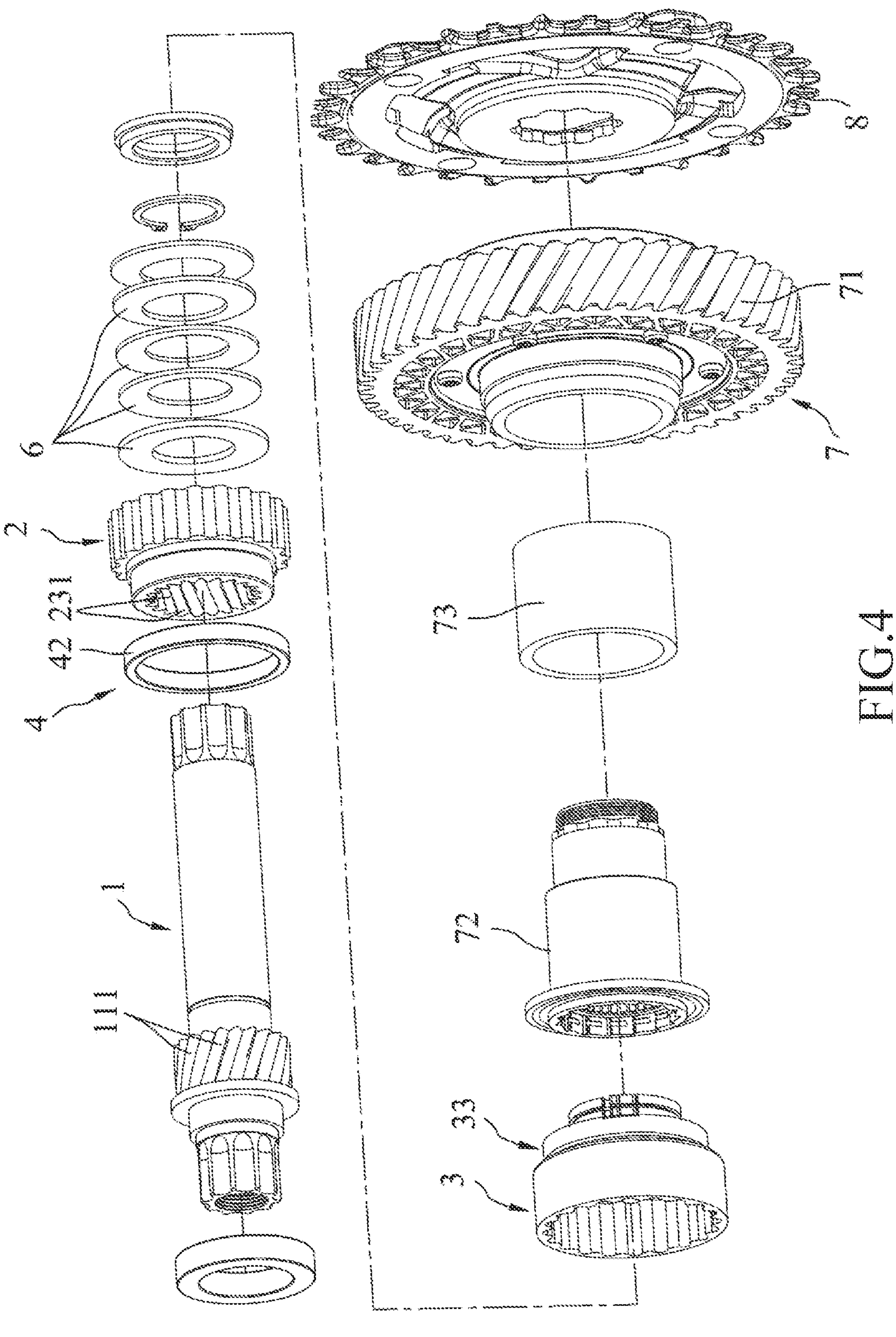
FIG. 4 is an exploded perspective view of a pedaling sensing device of an electric bicycle according to a second embodiment of this disclosure.
Figure 5:
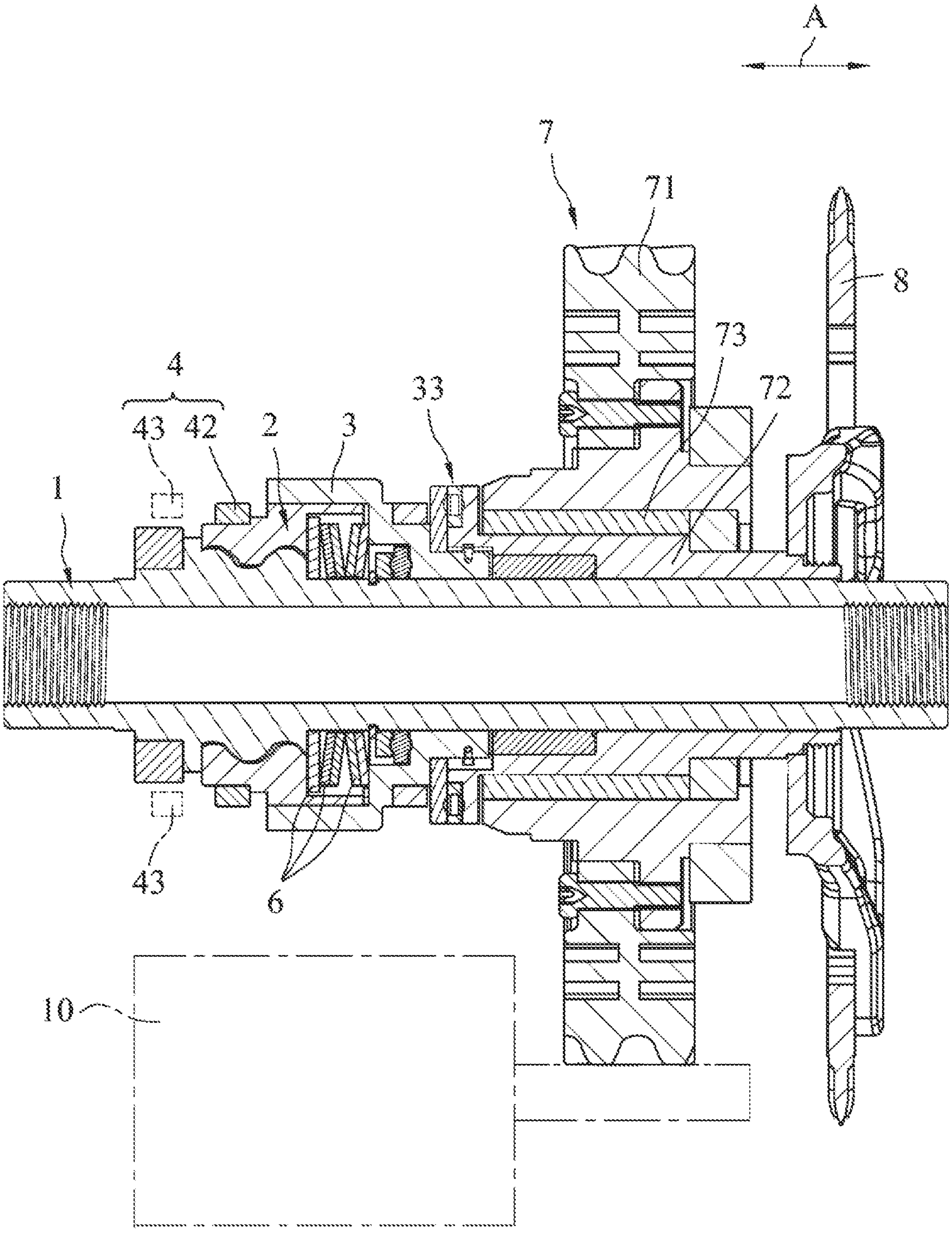
FIG. 5 is a sectional view of an assembled pedaling sensing device of the second embodiment.
Figure 6:
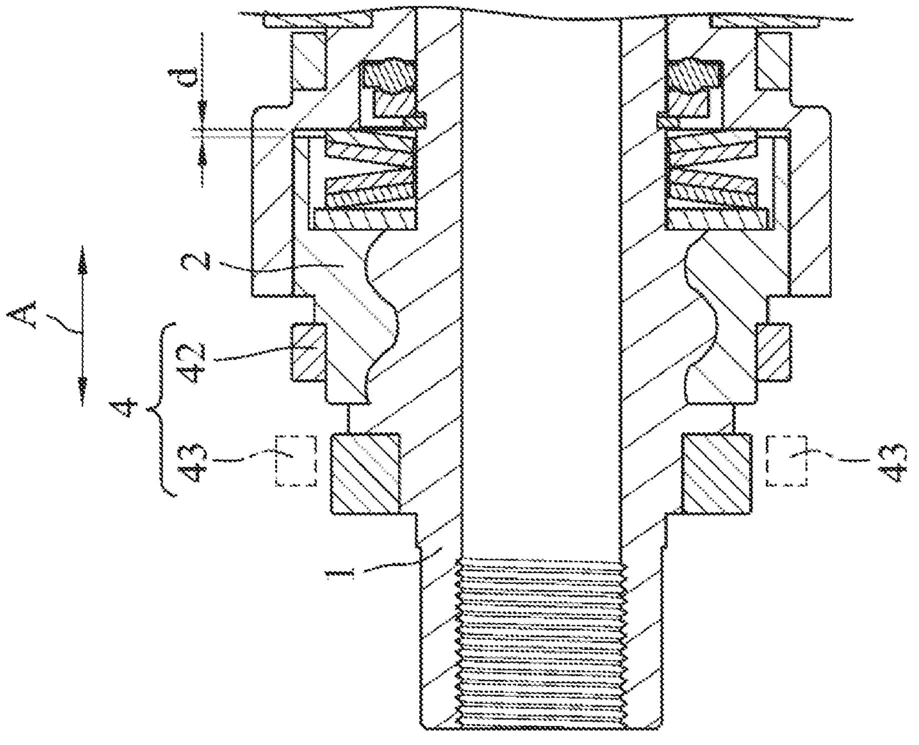
FIG. 6 is an enlarged sectional view of a part of FIG. 5.

Referring to FIGS. 4 to 6, the structure of the pedaling sensing device of an electric bicycle of a second embodiment of this disclosure is mostly the same as that of the first embodiment. Different from the first embodiment, the extension directions of the first bevel teeth 111 of the crank axle 1 and the second bevel teeth 231 of the first gearwheel 2 are opposite to those of the first embodiment. Accordingly, when the rider pedals forwardly to carry the crank axle 1 to rotate forwardly. That is, when the (pedaling) force is applied to the crank axle 1, the first gearwheel 2 can be driven by the crank axle 1 to rotate and move toward the assisting gearwheel 71 along the axial direction A.

The sensing unit 4 of the second embodiment comprises a magnet 42 disposed on the first gearwheel 2 and two magnetic sensing elements 43. The magnet 42 is correspondingly rotated with the first gearwheel 2, and the magnetic sensing elements 43 are disposed adjacent to the crank axle 1 for sensing a magnetic flux variation. The magnetic sensing elements 43 are signally connected to the motor 10.

The first gearwheel 2 is located between the magnetic sensing element 43 and the assisting gearwheel 71.

In the second embodiment, the pedaling sensing device comprises a plurality of elastic elements 6, which are disc springs arranged along the axial direction A and disposed around the crank axle 1. The elastic elements 6 are located between the first gearwheel 2 and the assisting gearwheel 71, and are configured for pushing the first gearwheel 2 toward the magnetic sensing elements 43.

Figure 7:
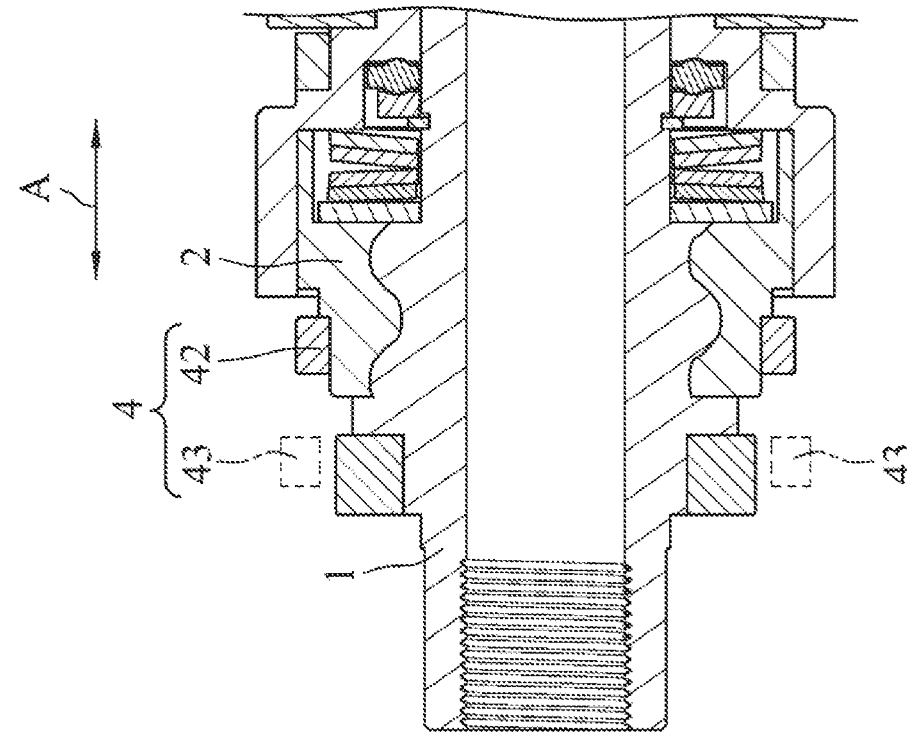
FIG. 7 is a sectional view similar to FIG. 6, wherein the first gearwheel of the second embodiment moves rightward from the position as shown in FIGS. 5 and 6.

With reference to FIGS. 5, 6 and 7, in the second embodiment, the magnetic sensing element 43 senses the magnetic flux variation caused by the movement of the magnet 42 so as to sense the applied (pedaling) force. Specifically, when the force is provided to rotate the crank axle 1 and the first gearwheel 2 is rotated along with the crank axle 1, the magnet 42 is also rotated and is moved along the axial direction A from the position as shown in FIG. 6. To be noted, the movement of the magnet 42 is very small as shown in FIG. 6 (a distance d). The magnet 42 is moved toward the assisting gearwheel 71 to reach the position as shown in FIG. 7, so the magnetic sensing element 43 can sense the magnetic flux variation so as to determine that the force is applied. Then, the magnetic sensing element 43 controls to enable the motor 10 for outputting a power to assist the rotation of the assisting gearwheel 71 and the chain wheel 8, thereby achieving the assisting riding effect. If the rider stops pedaling, the first gearwheel 2 will return to the original position as shown in FIG. 6, and the motor 10 stops operation.

As mentioned above, the first bevel teeth 111 of the crank axle 1 match the second bevel teeth 231 of the first gearwheel 2, and the first transmission structure 240 of the first gearwheel 2 matches the second transmission structure 310 of the second gearwheel 3. Accordingly, when the force is applied to rotate the crank axle 1, the first gearwheel 2 is carried to rotate and is moved along the axial direction A, so that the sensing unit 4 can sense the applied force and then control the motor 10 to provide the assisting power. This disclosure provides a novel structure, and the sensing unit 4 has a good sensing ability, thereby achieving the effect of easy riding.

Although the disclosure has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the disclosure.

What is claimed is:

1. A pedaling sensing device of an electric bicycle, which is configured to connect to a motor of the electric bicycle, comprising:

a crank axle extending along an axial direction and comprising an outer surface, wherein the crank axle is formed with a plurality of first helical teeth disposed around the outer surface, the plurality of first helical teeth are connected to each other and arranged continuously;

a first gearwheel disposed around the crank axle and comprising a first inner annulus surface and a first outer annulus surface opposite to the first inner annulus surface, wherein the first inner annulus surface is formed with a plurality of second helical teeth matching the plurality of first helical teeth, the plurality of second helical teeth are connected to each other and arranged continuously, the first outer annulus surface is formed with a first transmission structure;

a second gearwheel disposed around the first gearwheel and having a second inner annulus surface, wherein the second inner annulus surface is formed with a second transmission structure matching the first transmission structure;

an assisting unit disposed around the crank axle and connected with the motor; and a sensing unit disposed around the crank axle and located adjacent to the first gearwheel, wherein the sensing unit is signally connected with the motor, wherein when a force is applied to rotate the crank axle, the crank axle drives the first gearwheel and the second gearwheel to rotate through the plurality of first helical teeth and the plurality of second helical teeth, and the first gearwheel also moves relative to the crank axle along the axial direction, the sensing unit senses the movement of the first gearwheel along the axial direction and outputs a sensing signal so that the motor drives the electric bicycle forward through the assisting unit according to the sensing signal, wherein each of the plurality of first helical teeth has a first surface and a second surface which are connected to each other, each of the plurality of second helical teeth has a third surface and a fourth surface which are connected to each other, the first surface, the second surface, the third surface and the fourth surface are inclined planes, wherein the second gearwheel includes a first one-way mechanism, the assisting unit includes a connecting base having a second one-way mechanism that cooperates with the first one-way mechanism, when the crank axle is rotated by the force, the crank axle drives the connecting base to rotate only in a first direction through the first one-way mechanism and the second one-way mechanism, the first direction is a direction in which the crank axle is rotated by the force.

2. The pedaling sensing device according to claim 1, wherein when the crank axle is subjected to the force to rotate in the first direction, the first surface is in contact with the third surface, when the crank axle is subjected to another force to rotate in a second direction opposite to the first direction, the second surface is in contact with the fourth surface.

3. The pedaling sensing device according to claim 1, wherein during the rotation and movement of the first gearwheel, the plurality of first helical teeth and the plurality of second helical teeth maintain a continuous meshing state.

4. The pedaling sensing device according to claim 1, the tooth shapes of the plurality of first helical teeth and the plurality of second helical teeth are the same.

5. The pedaling sensing device according to claim 1, wherein in a direction perpendicular to the axial direction, a projection surface of the first transmission structure at least partially overlaps projection surfaces of the plurality of first helical teeth.

6. The pedaling sensing device according to claim 1, wherein in a direction perpendicular to the axial direction, the first gearwheel is located at least partially inside the second gearwheel.

7. The pedaling sensing device according to claim 1, wherein the plurality of second helical teeth are engaged with the plurality of first helical teeth.

8. The pedaling sensing device according to claim 1, wherein in a direction perpendicular to the axial direction, a projection surface of the first transmission structure, a projection surface of the second transmission structure, projection surfaces of the plurality of first helical teeth and projection surfaces of the plurality of second helical teeth overlap at least partially.

9. The pedaling sensing device according to claim 1, wherein in a direction perpendicular to the axial direction, the first gearwheel and the second gearwheel have an overlapping portion and a non-overlapping portion, the width of the non-overlapping portion along the axial direction is a distance of a movable range of the first gearwheel.

10. The pedaling sensing device according to claim 1, further comprising a chain wheel connected with the assisting unit, wherein the assisting unit comprises an assisting gearwheel and the connecting base, the connecting base is disposed around the crank axle and connects to the chain wheel, the connecting base is located between the crank axle and the assisting gearwheel.

11. The pedaling sensing device according to claim 1, wherein the sensing unit comprises a magnetic sensing element and a magnet, the magnetic sensing element is disposed facing the first gearwheel, the magnet is disposed around on the first gearwheel and correspondingly disposed with the magnetic sensing element.

12. The pedaling sensing device according to claim 11, wherein when the first gearwheel and the magnet move along the axial direction, the magnetic sensing element outputs the sensing signal according to the magnetic flux variation generated by the movement of the magnet.

13. The pedaling sensing device according to claim 12, wherein the first gearwheel and the magnet move away from the magnetic sensing element.

14. The pedaling sensing device according to claim 12, wherein the first gearwheel and the magnet move toward the magnetic sensing element.

15. The pedaling sensing device according to claim 11, further comprising an elastic element disposed around the crank axle and located between the first gearwheel and the second gearwheel, the elastic element pushes the first gearwheel toward the magnetic sensing element.

16. The pedaling sensing device according to claim 15, wherein the elastic element is composed of a plurality of elastic bodies.

17. The pedaling sensing device according to claim 1, wherein the sensing unit further comprises a pressure sensing element disposed around the crank axle, when the first gearwheel rotates, the pressure sensing element senses the applied force and outputs the sensing signal.

18. The pedaling sensing device according to claim 17, further comprising a thrust bearing disposed around the crank axle and located between the first gearwheel and the pressure sensing element.

19. A pedaling sensing device of an electric bicycle, which is configured to connect to a motor of the electric bicycle, comprising:

a crank axle extending along an axial direction and comprising an outer surface, wherein the crank axle is formed with a plurality of first helical teeth disposed around the outer surface, the plurality of first helical teeth are connected to each other and arranged continuously;

a first gearwheel disposed around the crank axle and comprising a first inner annulus surface and a first outer annulus surface opposite to the first inner annulus surface, wherein the first inner annulus surface is formed with a plurality of second helical teeth matching the plurality of first helical teeth, the plurality of second helical teeth are connected to each other and arranged continuously, the first outer annulus surface is formed with a first transmission structure;

a second gearwheel disposed around the first gearwheel and having a second inner annulus surface, wherein the second inner annulus surface is formed with a second transmission structure matching the first transmission structure;

an assisting unit disposed around the crank axle and connected with the motor; and a sensing unit disposed around the crank axle and located adjacent to the first gearwheel, wherein the sensing unit is signally connected with the motor, wherein when a force is applied to rotate the crank axle, the crank axle drives the first gearwheel and the second gearwheel to rotate through the plurality of first helical teeth and the plurality of second helical teeth, and the first gearwheel also moves relative to the crank axle along the axial direction, the sensing unit senses the movement of the first gearwheel along the axial direction and outputs a sensing signal so that the motor drives the electric bicycle forward through the assisting unit according to the sensing signal, wherein each of the plurality of first helical teeth has a first surface and a second surface which are connected to each other, each of the plurality of second helical teeth has a third surface and a fourth surface which are connected to each other, the first surface, the second surface, the third surface and the fourth surface are inclined planes, wherein in a direction perpendicular to the axial direction, the first gearwheel and the second gearwheel have an overlapping portion and a non-overlapping portion, the width of the non-overlapping portion along the axial direction is a distance of a movable range of the first gearwheel.

* * * * *